June 23, 1942. O. E. NELSON 2,287,322
APPARATUS FOR TESTING COLOR
Filed Dec. 14, 1939
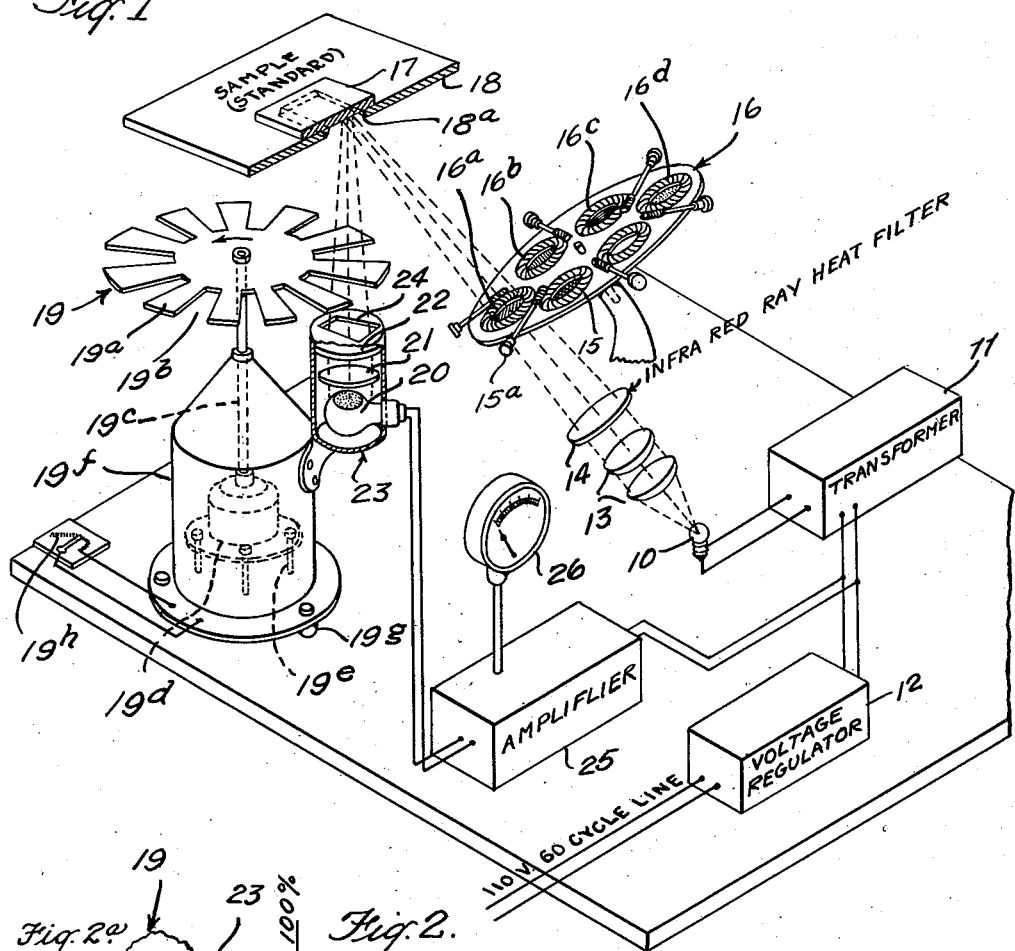
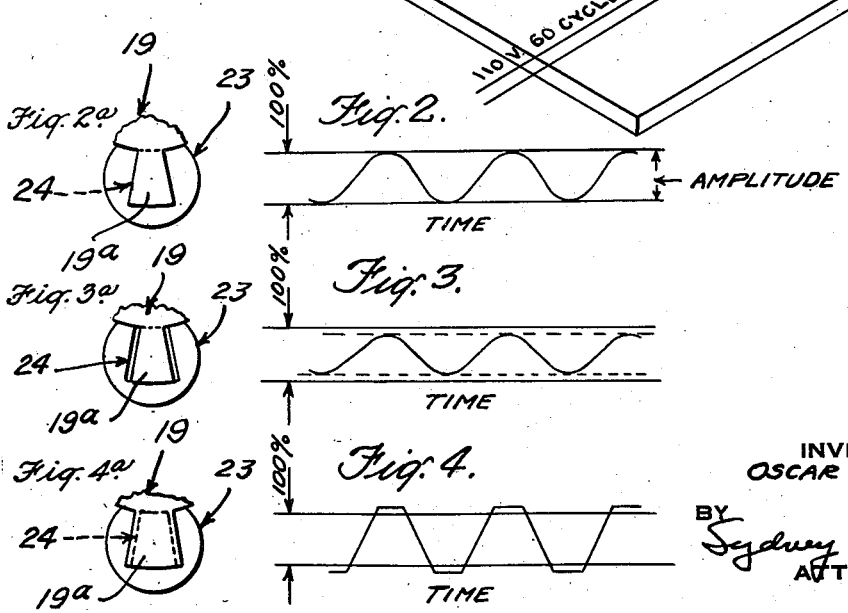
INVENTOR
OSCAR E. NELSON.
BY Sydney G. Berry
ATTORNEY Patented June 23, 1942

2,287,322

UNITED STATES PATENT OFFICE 2,287,322

APPARATUS FOR TESTING COLOR

Oscar E. Nelson, Tyrone, Pa., assignor to West Virginia Pulp and Paper Company, New York, N. Y., a corporation of Delaware Application December 14, 1939, Serial No. 309,142

1 Claim. (Cl. 250—41.5)

My present invention relates to an improved apparatus for testing color, and more especially for testing the reflecting qualities of surfaces, as for example, paper. Among the objects of my invention is to provide means for imparting to the current of the photoelectric cell a substantially true sine characteristic, so that when the current is amplified the output of the amplifier will be substantially proportional to the input.

Other objects and advantages thereof will be apparent from the following detailed description taken with the annexed drawing in which:

Fig. 1 is an isometric view of a preferred embodiment with the cover removed; while Figures 2, 3 and 4 show the characteristics of the current produced in the photoelectric cell, depending upon the relation of the size of window of the cell to that of the vanes producing an interruption of the light beam;

Figs. 2a, 3a and 4a show diagrammatically the relationship of vane to window opening responsible for the current characteristics as illustrated in Figs. 2, 3 and 4, respectively.

Referring to Fig. 1, 10 denotes a light source formed preferably of a light bulb of a type consuming approximately 7.5 amperes at 10 volts, such current being supplied by the aid of a voltage regulator 12 disposed in a 110 volt circuit of alternating current, as shown, and a transformer 11, the devices mentioned being standard in the art for the purposes specified. The light from bulb 10 passes through a condenser 13, an infra red heat filter 14, and then through any one of the various filters 16a, 16b, 16c, etc., desirably arranged on a wheel 16 whereby any desired filter may be brought into operative position. Preferably each filter element 16a, etc. is provided with an iris diaphragm 15, each of which is adjustable as by a screw device 15a. Each of the filter elements 16a, etc. passes a definite band of wave lengths, which bands collectively will cover the visual spectral range, i. e., from 400 to 700 millimicrons wave length. Preferably the filter elements are arranged in a definite order according to the wave length ascribed to each. By virtue of this form of device, light of one wave length may be readily substituted for another over a desired range by rotating the wheel to bring the desired light filter into the path of the light beam. Alternatively a prism may be used the position of which can be varied slightly to furnish light of the desired comparatively narrow frequency range.

The light passing from a filter element 16 is directed upon a surface 17 which is either a standard of comparison such as a block of magnesium carbonate or the specimen to be tested. The element 17 is supported upon a plate 18 having an aperture 18a of suitable size not substantially larger than the cone of light passing to and from the reflecting surface in order to eliminate stray rays of light. The angle of the incident beam to the surface of element 17 is susceptible of variation, but I have found an angle of around 47 degrees to give the best results. The beam reflected from the element 17 is preferably periodically interrupted by means of a rotary shutter 19 comprised of spaced vanes 19a, the spaces 19b between the vanes being of substantially the same size as the vanes themselves. The shutter 19 is attached to a spindle 19c of motor 19d which is resiliently supported on legs 19e preferably three in number, the motor and spindle being enclosed in a housing 19f, which in turn is resiliently secured to the bottom of the cabinet by means of screws 19g. The speed of the motor may be controlled through rheostat 19h.

The interrupted light beam now is caused to fall upon the window of photoelectric cell 20 by the aid of condensing lens 21 above which is heat filter 22, the elements 20, 21, 22 being disposed in a cell 23 having an aperture 24 of a size having a relation to the vanes 19a such that the shadow of the vane is closely equal to the size of the aperture 24, thereby producing a fluctuating current in the photoelectric cell having a substantially true sine characteristic such as shown in Fig. 2. Fig. 3 illustrates the situation where the shadow of vane 19a is less than the area of the aperture 24, thereby producing a since wave which is less than 100% modulated and of less amplitude than that of Fig. 2. Fig. 4 shows the situation where the vane shadow is larger than the aperture, producing in excess of 100% modulation and a distorted sine wave.

The output from cell 20 is fed to an amplifier of known type 25 comprising a series of thermionic tubes the output from which is fed to a galvanometer 26.

In the use of the device a standard of comparison, as for example a magnesium carbonate block, is placed behind the aperture 18a, a particular filter element of the wheel 16 is selected, as for example that in the lowest range of the spectrum, the light 10 lighted, and the shutter 19 set in rotation by means of motor 19d which drives the shutter at suitable speed, e. g., 2200 R. P. M., thereby interrupting the light 24,200 times per minute for the shutter shown having eleven vanes and producing a pulsating current capable of being amplified by the amplifier 25. The iris diaphragm 15 of the filter selected is now adjusted so that the indicator or galvanometer 26 reads an arbitrary value, say 98, corresponding to the reflecting power of the magnesium carbonate surface of substantially 98%. The wheel 16 is turned so as to bring into operative position a new filter element, which may be either the next one in the spectral series or such other one as it is desired to use in the test, whereupon the iris diaphragm 15 associated with that filter element is adjusted as previously described to give the reading on the galvanometer of 98. The process of calibration described is then repeated for as many filter elements as may be involved in the test. The magnesium carbonate block is then removed from over the aperture 18a and replaced by the surface to be tested, as for example, a sheet of paper. When this has been done a series of readings of the galvanometer are then taken, one each for the filter elements involved in the test, without, however, altering the setting of the iris diaphragms which have been previously determined. From the foregoing it will be evident that the galvanometer readings will give an accurate measure of the reflecting power of the sample tested for the particular wave bands used. It is possible to use a single iris diaphragm which would be mounted in the path of the beam of light and independently of the wheel 16. This arrangement, however, requires that the diaphragm be calibrated by means of the magnesium carbonate block each time a different filter element is used.

Since in each case the intensity of the light from the standard of comparison is regulated so as to give the same reading, i. e., of 98, on the indicator, the amount of light energy received by the photoelectric cell is always the same for each wave band when using the standard of comparison. It will therefore be apparent that once it is determined that intensities up to this maximum lie upon the straight line portion of the output curve of the photoelectric cell, the indicator readings will give an accurate measure of the reflecting power of the samples tested. Furthermore, by virtue of the fact that the current amplified has substantially true sine characteristics, a minimum of error is introduced in the use of the amplifier 25.

It will be apparent that the benefit flowing from my above described method of using the same energy input to the photoelectric cell for each wave band tested may be realized even though the output of the photoelectric cell is amplified in other ways, as for example, by using an uninterrupted light beam and producing a steady current in the photoelectric cell which is used to bias the receiving grid of a thermionic amplifier.

While I have illustrated and described in detail certain preferred forms of my invention, it is to be understood that other changes may be made therein and the invention embodied in other structures. I do not, therefore, desire to limit myself to the specific construction illustrated, but intend to cover my invention broadly in whatever form its principle may be utilized.

I claim:

In a device for measuring the reflection characteristics of a surface to be tested, and employing a photoelectric cell against which a beam of light from said surface is impinged, a thermionic amplifier for said cell and an indicating device actuated thereby, the improvement which consists in the combination with the foregoing of a light interrupting device in the path of said beam to said cell, said device consisting of a plurality of movable vanes and means for driving same, an apertured diaphragm coacting therewith whereby to periodically interrupt said light beam, said vanes and the aperture being so arranged that the shadows of said vanes cast upon said aperture are substantially equal in size and area to said aperture whereby a current of substantially 100% modulation and of substantially sine form is produced in said cell and of a frequency facilitating the amplification of said current by said amplifier.

OSCAR E. NELSON.